(12) United States Patent
Basir

(10) Patent No.: US 9,042,873 B2
(45) Date of Patent: May 26, 2015

(54) ON THE ROAD GROUPS

(75) Inventor: Otman A. Basir, Waterloo (CA)

(73) Assignee: INTELLIGENT MECHATRONIC SYSTEMS INC., Waterloo, Ontario (CA)

( * ) Notice: Subject to any disclaimer, the term of this patent is extended or adjusted under 35 U.S.C. 154(b) by 0 days.

(21) Appl. No.: 13/154,967

(22) Filed: Jun. 7, 2011

(65) Prior Publication Data

US 2011/0300840 A1 Dec. 8, 2011

Related U.S. Application Data

(60) Provisional application No. 61/352,148, filed on Jun. 7, 2010.

(51) Int. Cl.
G10L 15/26 (2006.01)
H04W 4/08 (2009.01)
H04W 8/18 (2009.01)
H04W 4/04 (2009.01)

(52) U.S. Cl.
CPC ............ *G10L 15/265* (2013.01); *H04W 4/04* (2013.01); *H04W 4/046* (2013.01); *H04W 4/08* (2013.01); *H04W 8/186* (2013.01)

(58) Field of Classification Search
CPC ....... G10L 15/26; G10L 15/265; H04W 4/04; H04W 4/043; H04W 4/046; H04W 4/06; H04W 4/08; H04W 8/186; H04M 3/56; H04M 7/0027; H04M 7/006; H04L 65/403; H04L 65/4015; H04L 12/581; H04L 51/04; H04L 67/2833; H04L 67/306; H04L 67/28; H04L 67/24

USPC .......... 455/416, 456.2, 456.3, 463, 41.2, 518, 455/519, 569.1, 569.2, 517; 370/259–263, 370/346

See application file for complete search history.

(56) References Cited

U.S. PATENT DOCUMENTS

| | | | |
|---|---|---|---|
| 6,204,844 B1 * | 3/2001 | Fumarolo et al. | 715/736 |
| 6,253,122 B1 | 6/2001 | Razavi et al. | |
| 6,362,748 B1 | 3/2002 | Huang | |
| 6,459,892 B2 * | 10/2002 | Burgan et al. | 455/412.1 |
| 6,788,949 B1 | 9/2004 | Bansal | |
| 7,024,207 B2 * | 4/2006 | Gorday et al. | 455/456.1 |
| 7,092,723 B2 | 8/2006 | Himmelstein | |
| 7,272,357 B2 * | 9/2007 | Nishiga et al. | 455/11.1 |
| 7,286,825 B2 | 10/2007 | Shishido et al. | |
| 7,315,746 B2 * | 1/2008 | Caspi et al. | 455/456.1 |

(Continued)

FOREIGN PATENT DOCUMENTS

EP 1768437 A2 * 3/2007

OTHER PUBLICATIONS

Non-Final Office Action for U.S. Appl. No. 12/954,084 mailed on Feb. 19, 2013.

(Continued)

*Primary Examiner* — Nizar Sivji
(74) *Attorney, Agent, or Firm* — Carlson, Gaskey & Olds, PC

(57) ABSTRACT

A mobile or in-vehicle communication system and method facilitate communication among groups. The system and method also facilitate the creation of such groups. The system and method may convert speech from one member of the group to text for distribution to other members of the group, for whom the text is converted to audible speech.

18 Claims, 3 Drawing Sheets

(56) References Cited

U.S. PATENT DOCUMENTS

| | | |
|---|---|---|
| 7,356,474 B2 | 4/2008 | Kumhyr |
| 7,412,078 B2 | 8/2008 | Kim |
| 7,418,346 B2* | 8/2008 | Breed et al. ............ 701/301 |
| 7,460,028 B2 | 12/2008 | Garibotto et al. |
| 7,554,435 B2 | 6/2009 | Tengler et al. |
| 7,774,010 B2* | 8/2010 | Kokkonen et al. ........... 455/518 |
| 7,865,178 B2* | 1/2011 | Haaramo et al. .......... 455/414.1 |
| 7,865,309 B2 | 1/2011 | Taylor |
| 8,218,737 B2 | 7/2012 | Odinak |
| 8,289,186 B2 | 10/2012 | Osafune |
| 8,350,721 B2 | 1/2013 | Carr |
| 8,458,321 B2* | 6/2013 | Agulnik et al. ............ 709/224 |
| 2003/0096621 A1* | 5/2003 | Jana et al. .................. 455/456 |
| 2004/0082340 A1 | 4/2004 | Eisinger |
| 2004/0116106 A1* | 6/2004 | Shishido et al. ........... 455/414.2 |
| 2005/0002347 A1* | 1/2005 | Lee et al. .................. 370/312 |
| 2005/0222752 A1* | 10/2005 | Sokola et al. ............... 701/200 |
| 2006/0235981 A1* | 10/2006 | Westman et al. ............ 709/227 |
| 2007/0021137 A1* | 1/2007 | Kokkonen et al. ........... 455/518 |
| 2007/0162552 A1 | 7/2007 | Shaffer et al. |
| 2007/0285280 A1 | 12/2007 | Robinson et al. |
| 2008/0077309 A1* | 3/2008 | Cobbold .................... 701/117 |
| 2009/0161841 A1* | 6/2009 | Odinak ...................... 379/88.22 |
| 2009/0298474 A1* | 12/2009 | George ...................... 455/412.2 |
| 2010/0011081 A1* | 1/2010 | Crowley et al. ............ 709/206 |
| 2010/0130180 A1* | 5/2010 | Lim ........................... 455/414.1 |
| 2010/0248692 A1* | 9/2010 | Keller et al. ............... 455/412.1 |
| 2010/0259370 A1 | 10/2010 | Chen et al. |
| 2011/0121991 A1 | 5/2011 | Basir |
| 2011/0150200 A1* | 6/2011 | Uhler et al. ............... 379/202.01 |
| 2011/0302253 A1* | 12/2011 | Simpson-Anderson et al. ........................ 709/206 |
| 2012/0072590 A1* | 3/2012 | Holt et al. .................. 709/224 |

OTHER PUBLICATIONS

Final Office Action for U.S. Appl. No. 12/954,084 mailed on Sep. 26, 2013.

Non-Final Office Action for U.S. Appl. No. 12/954,084 mailed on May 22, 2014.

* cited by examiner

ON THE ROAD GROUPS

This application claims priority to U.S. Provisional Application Ser. No. 61/352,148, filed Jun. 7, 2010.

BACKGROUND

Mobile communication devices permit people to stay in contact almost continuously via voice, texting, email, chat, social media websites, etc. Keeping in touch while driving a vehicle can be difficult, if not dangerous. Prior applications and products from the present assignee address this problem with a device that provides efficient voice-only communication in the vehicle.

SUMMARY

The present invention provides a mobile or in-vehicle communication system and method facilitating communication among groups. The system and method also facilitate the creation of such groups. The system and method may convert speech from one member of the group to text for distribution to other members of the group, for whom the text is converted to audible speech. Alternatively, recorded audible speech files may be transmitted to the members for playback.

DETAILED DESCRIPTION OF THE PREFERRED EMBODIMENT

Figure 1:
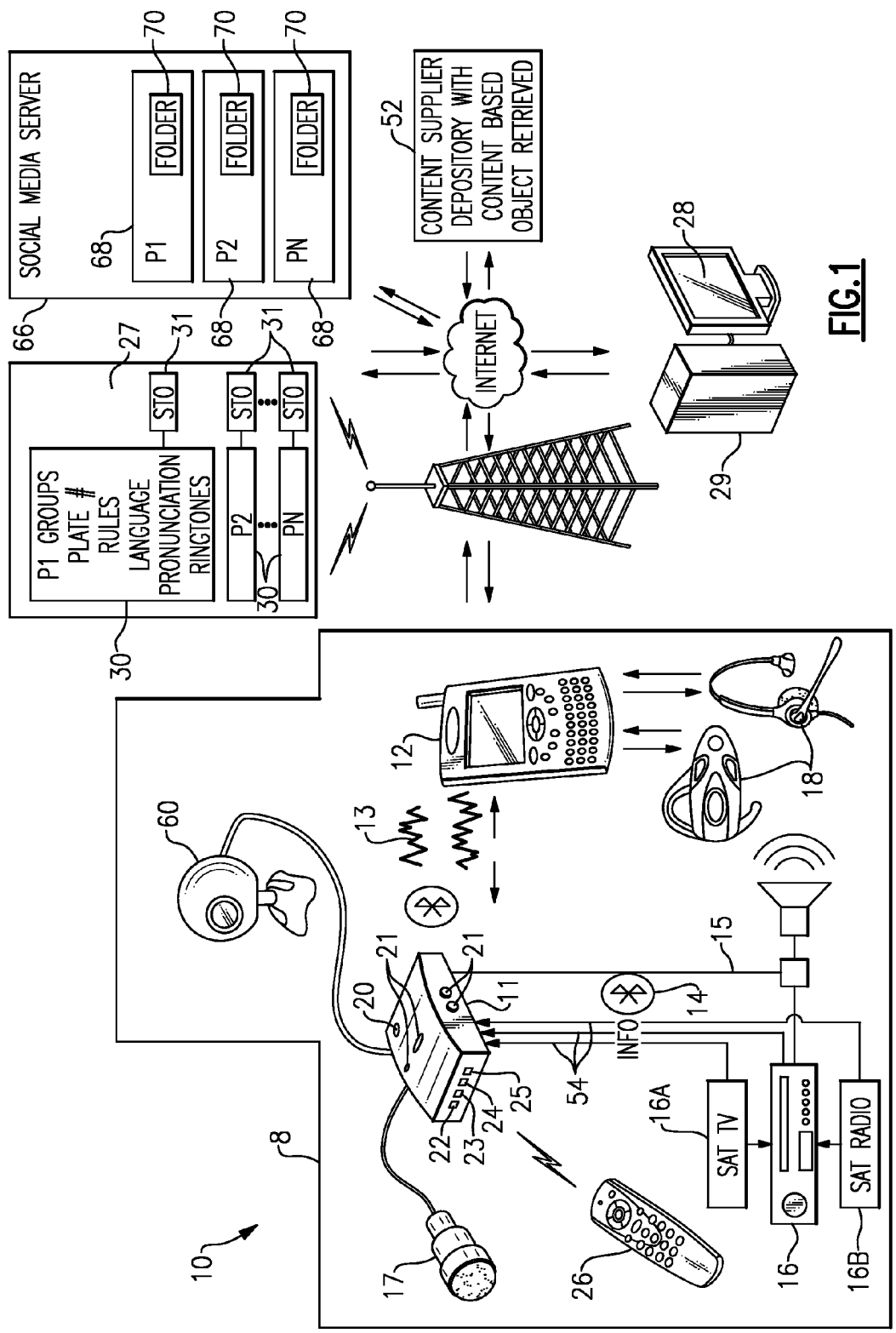
FIG. 1 schematically illustrates a communication system according to one embodiment of the present invention.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile device 12. All data 13 is encrypted prior to transmission. The audio output of the control unit 11 is transmitted either wirelessly 14 or through a direct, wired connection 15 to the vehicle's sound system, which may include a radio 16, satellite TV 16A, satellite radio 16B, etc. The audio input for the control unit 11 is obtained either through a directly connected microphone 17, through an existing vehicle hands-free system, or wirelessly though a headset 18 connected to the mobile device 12. The control unit 11 may also have a video output transmitting video received from a video camera 60, or received from a video camera built into mobile device 12. In one example, the control unit 11 receives both audio and video from the video camera 60 or from the mobile device 12.

The control unit 11 connects to the vehicle's battery for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile device 12; and clear all preferences and reset the device to its factory default settings. The control unit 11 also has a set of four status lights 21 which display the following information: power and system health, vehicle connection status and activity, mobile device connection status and activity, and information access and general status.

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8 or on the mobile device 12 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features (e.g. video camera 60); and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (e.g. just like connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The driver stores his or her settings for the device in their settings profile 30. The driver may also store a license plate number for the vehicle 8 in the settings profiles 30. This profile 30 may be stored in a database on an Internet server 27. The control unit 11 utilizes the internet access provided by the driver's mobile device 12 to download the driver's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The profile 30 may also indicate groups to which the user belongs. The driver can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

Figure 2:
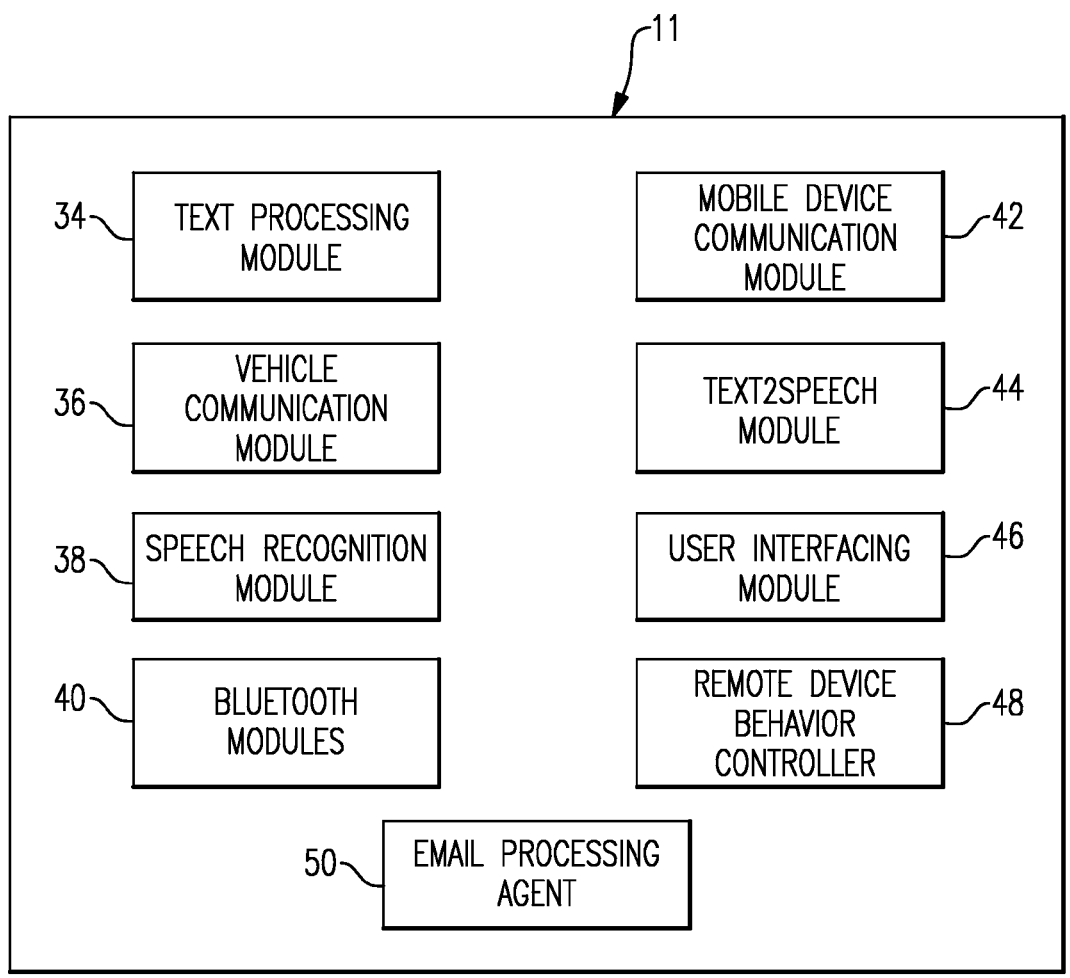
FIG. 2 schematically illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

Communication with Other Vehicles

Figure 3:
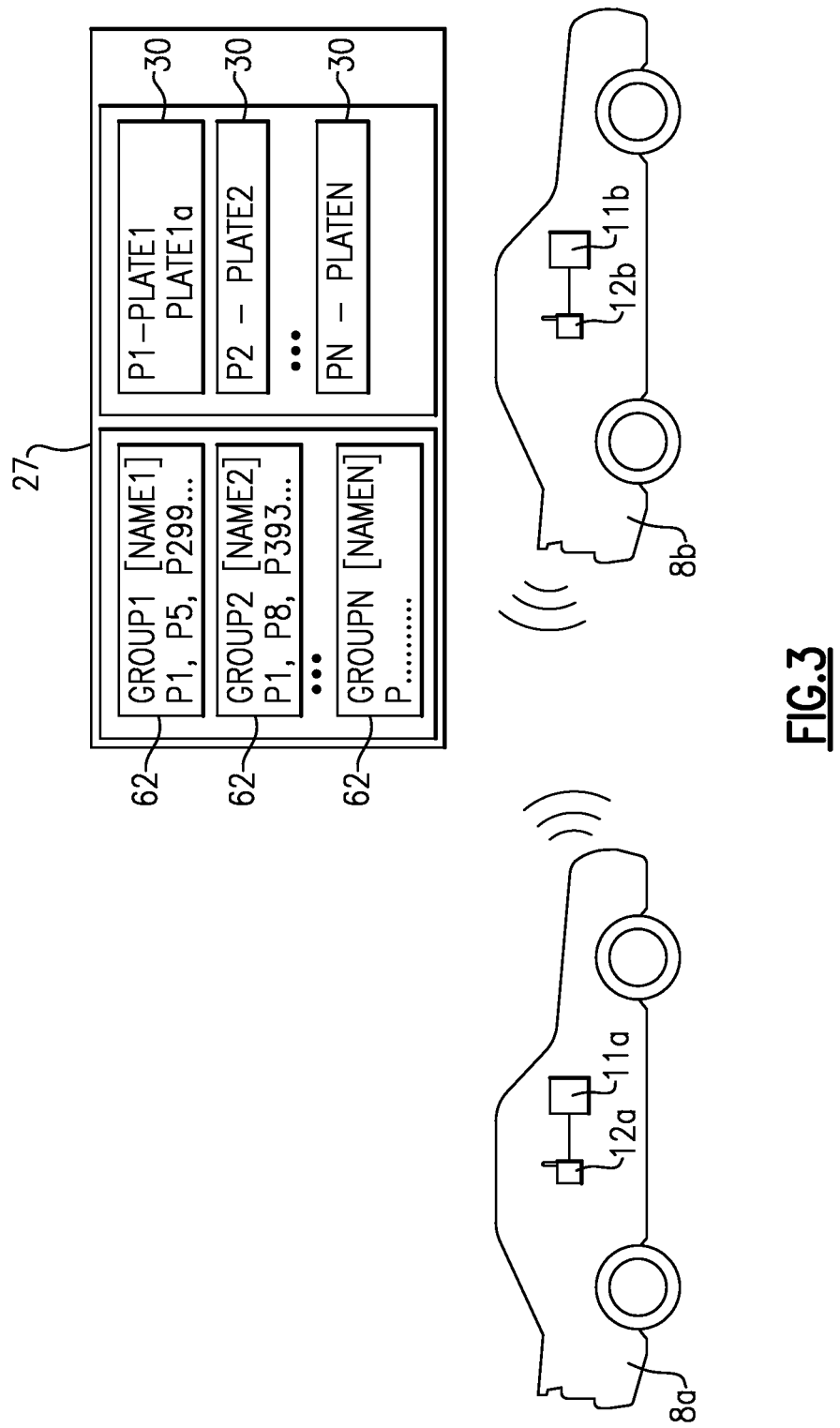
FIG. 3 illustrates the vehicle-to-vehicle communication using the system of FIGS. 1 and 2.

The vehicle 8 is operable to wirelessly communicate with other vehicles. Referring to FIG. 3, a first vehicle 8*a* includes a first control unit 11*a* and a first mobile device 12*a*, and a second vehicle 8*b* includes a second control unit 11*b* and a second mobile device 12*b*. Using the control device 11*a*, an operator of vehicle 8*a* ("inviter") can initiate a communication with an operator of the vehicle 8*b* ("invitee"). Although the terms "operator" and "driver" are used throughout this application, it is understood that vehicle passengers could also use the control device 11 to engage in communication. The inviter could enter a license plate of the vehicle 8*b* to identify the vehicle 8*b*. This information could be spoken and converted to text using the speech recognition module 38, or could be entered using a keyboard (e.g. keyboard on mobile device 12*a*). An invitation message may then be transmitted to the identified vehicle 8*b*.

In one example an invitation message is sent to only a vehicle corresponding to a specified license plate. In one example, an invitation message is sent to all vehicles within a predefined vicinity of the invitee vehicle. The invitation message could include information such as a license plate number of the invitee vehicle, the communication addressing information of the inviter (e.g. name, nickname, etc.), and a description of the inviter's vehicle (e.g. brand, color, etc.).

Once the invitee vehicle 8*b* receives a communication invitation from the inviter vehicle 8*a*, the control unit 11*b* notifies the operator of the invitation. If the invitation is accepted, a chatting connection is established between the control units 11*a-b* so that both operators can chat using voice, text (e.g. using speech recognition module 38 or using a keyboard of mobile device 12), or video (e.g. using video camera 60, or using video functionality of mobile device 12).

The server 27 runs one or more applications for decoding a vehicle license plate number to an addressable piece of data (e.g. IP address, CIM, satellite receiver identification number, etc.). A license plate of the inviter vehicle 8*a* may be stored in the user settings profile 30 for an operator of the vehicle 8*a*. In one example an operator may store multiple license plates in their profile if they own multiple vehicles (e.g. Plate1 and Plate1*a*), such that the control device 11 can seamlessly be moved between vehicles. In one example, if the invitee vehicle 8*b* does not have a registered license plate, the server 27 cannot identify the vehicle 8*b* and the invitation is automatically rejected.

The mobile devices 12*a-b* may communicate using a variety of communication means. In one example, the control units 11 communicate with one another via text chat, speech to text, video chat, or voice over IP either directly with one another, vehicle to vehicle, such as by radio frequency, Bluetooth, Wi-Fi, citizen's band ("CB") radios, or other comparable short range communication devices. Alternatively, the communication (text chat, speech to text, video chat, or voice over IP) can take place via the server 27. The communications may be logged on the server 27 (if used) and/or locally on the control units 11. In one example, the mobile devices 12*a-b* correspond to Bluetooth headsets each operable to communication with a Bluetooth receiver in the other of the two vehicles 8*a-b*. In one example, the mobile devices 12*a-b* communicate via satellite, with or without using cellular towers.

Each mobile device 12*a-b* may use an onboard localization device (e.g. GPS module) for determining vehicle location. A GPS vehicle location could be used when sending an invitation message to neighboring vehicles such that the server 27 determines which vehicles are in proximity to the inviting vehicle by comparing GPS positions.

The inter-vehicle communication features discussed above may be useful for a variety of reasons. For example, an operator of vehicle 8*a* may wish to notify an operator of vehicle 8*b* that a tire on vehicle 8*b* is partially deflated. As another example, an operator of vehicle 8*a* may wish to engage in a social conversation with an operator of vehicle 8*b*. As another example, an operator of vehicle 8*a* may wish to notify an operator of vehicle 8*b* of hazardous road conditions, or of impending traffic.

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (e.g., 18r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (e.g. "I'm in the car call me at 'number,'" or "I'm in the car, I will reply as soon as I can"). New emails can also be created and sent as a voice recording in the form of a .wav, .mp3 or other file format. The driver is also provided the option of calling the sender of the email on the phone using existing contact information in the address book, or responding to meeting requests and calendar updates (e.g. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the driver is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (e.g. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom .mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available. In one example, the control unit 11 automatically rejects communication attempts from neighboring control units 11 such that no chatting is initiated in the "do not disturb" mode.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (e.g., .wav, .mp3), HTML (e.g. encoded emails and web sites), plain text portions of Word and PowerPoint files, Adobe Portable Document format (PDF), OpenDocument formats, and compressed and/or encoded attachments of the above formats (e.g. .zip).

Third, the device provides environment and location awareness. This includes current location and navigation information, local weather conditions, vehicle status, and relevant location-specific information (e.g. where is "work", where is "home?").

Fourth, the control unit 11 provides remote access to information. This includes existing news sources (e.g. existing RSS feeds) and supported websites. This also includes subscription to value-added services including: weather, custom alerts (e.g. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather
Custom alerts (e.g. stock price triggers)
Traffic conditions
Personalized news
e-books (not limited to audio-books, but any e-book)
Personalized audio feeds
Personalized image or video feeds for passengers All text information is parsed and translated to optimize intelligibility before being read out loud to the individual.

Notification rules can be set by the individual using any combination of time interval, in-vehicle presence, and importance of the news event with appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content is performed using a server with a wired data connection. Appropriate instances to present new information are detected locally (within the vehicle). When an appropriate instance occurs, a short request is sent to trigger the transmission of the most recent personalized news information from the search server.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (e.g. email addresses and web site URLs) with simple names and words. The driver can also choose to hear only select information when a new email arrives (e.g. just the sender name, or the sender and subject, or a quick summary). Email "ring tones" are also available for incoming emails based on sender or specific keywords. Prepared text or voice replies can be used to send frequently used responses (e.g. "I'm in transit right now"). Some prepared quick-responses may be used to automatically forward an email to a pre-selected recipient such as an administrative assistant. The driver can also set up both email address configuration and multiple email address rules (e.g. use "me@work.com" when replying to emails sent to "me@work.com," but use "me@mobile.com" when composing new emails).

The driver can also customize notification. This includes prioritizing emails and phone calls based on caller or sender and subject (e.g. never read emails from Ben out loud, or if an email arrives from George, it should be read before others). The driver can also limit the amount of notifications received (e.g. set minimum time between notifications, or maximum number of emails read in a short period of time).

Time-sensitive rules in the profile 30 may include options such as "don't both me in the morning," or "only notify me about incoming email between these hours." The driver can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (e.g. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (e.g. IMS, USB).

Information about specific words or phrases can be used to enhance both speech recognition performance and text-to-speech performance, and this includes context sensitive shortcuts. For example, nicknames should be expanded into an email address if the driver is dictating an email. In addition, email addresses should be expanded to a common name when found. The driver can also set custom voice prompts or greetings.

The device also features multiple user support, wherein multiple people can share the same device. The device automatically identifies each person by their mobile device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (e.g., HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The driver could also use the control unit 11 through an advanced wireless audio/visual system, including such features as streaming music and providing image content (e.g. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the driver can expand the functionality of the device by attaching such items as a USB GPRS/EDGE/3G device for direct mobile access without a separate mobile device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (e.g. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (e.g. similar to connecting a digital camera or GPS unit directly to a computer).

Media Exchange

As indicated, the control unit 11 also plays audio files, such as .mp3s, .wavs, .AIFFs, and other compressed or uncompressed audio formats, as well as video files. The user can request any media content (e.g., songs, video, books, etc) in several ways. The user interfaces with the control unit 11, which sends an email request to the server 27 (or a dedicated server) via the mobile device 12 with as much information as the user can include, such as author, singer, title, media type, etc. The control unit 11 could generate the email using speech to text conversion. The control unit 11 could alternatively attach an audio file with a voice request from the user for the media content (again identifying author, singer, title, media type, etc). The control unit 11 could also send an audio file of the user humming a desired song.

The entertainment system components 16, 16A, 16B may send content info (e.g. RBDS/RDS info) identifying the song title and artist currently being played to the control unit 11 (such as via lines 54). Alternatively, the control unit 11 can listen to the audio being played over the speakers (such as via line 15 or via microphone 17). If the user indicates that he likes the currently-played media content (such as by speaking, "I like this song," or "I like this video"), the control unit 11 identifies the currently-played media content (which identification it may already have directly, or which it can obtain by sampling the media content via line 15 or via microphone 17 and sending it to a server, such as server 27, for identification). After the control unit 11 has determined the identity of the media content, the control unit 11 may recite the information to the user, including a cost for purchasing the media content and offering the option to purchase the media content. The control unit 11 may also ask the user what format to purchase the media content (e.g., .mp3 by download, CD by mail, DVD by mail, etc), whether to purchase only the specific media content or to purchase an entire album containing the media content, whether to explore other media content by the same artist, etc. Upon verbal request from the user, the control unit 11 sends the request of the media content, such as by sending an email request to the server 27.

Whatever the format of the request, the server 27 will parse the email request to identify the requestor and to determine the desired media content. Some assumptions may be made, for example, if the user only specifies an author or singer, that singer/author's most recent work is provided.

Once the media content is purchased, the server 27 retrieves the media content from its own databases or other databases 52 accessible over the internet (or other wide area network). The server 27 then attaches the requested media content to an email containing identifying information and sends it to the user. The control unit 11 receives the email via the mobile device 12, identifies the response to the request, stores the media content in storage on the control unit 11 and begins playback. Optionally, when appropriate, the server 27 may charge the user's account for the purchase of the media content (the user's account may be linked to a credit card, bank account, or other payment method).

After retrieval and storage, the control unit 11 identifies the media content that was received to the user by announcing the title, author/singer, media type, etc. and asking the user if the user wants the control unit 11 to play the media content, archive the media content or ignore the media content. Playback can be controlled by voice commands (fast forward, rewind, repeat, pause, play, etc).

As an option, each of the accounts 30 further includes an associated media storage account 31 in which any media content requested by the user is stored before a copy is forwarded to the user's control unit 11. This provides a backup of the media content and facilitates sharing the media content with others.

The user can forward media content to other users by interfacing with the control unit 11 to generate an email to the server 27 that specifies the content (as above) and also specifies the person or account to whom the media content will be forwarded. If the content is already stored in the sender's media storage account 31, the server 27 will send a copy to the recipient's media storage account 31 and email a copy to the intended recipient. If the content is not already stored in the sender's media storage account 31, the server 27 will obtain a copy (as above) and put it in the recipient's media storage account 31. The server 27 will charge the sender's account for the content sent to the recipient, as appropriate based upon licensing arrangements. The recipient's control unit 11 (or similar) would announce the content and the sender and ask to play the content.

The media may be provided in a proprietary format readable only by the server 27 and authorized control units 11.

Each user's media storage account 31 stores all media content requested by the user and all media content received from others. When the control unit 11 detects the user's mobile device 12 connected to the control unit 11, a message is sent to the server 27 indicating that the user can now receive media content. Server 27 will provide a report that the control unit 11 will read to user listing media content in the media storage account 31. The user can choose media content to play, to archive onto the control unit 11, reject, or postpone receiving. Each user has their own media storage account 31, as they have mailboxes. The user can check the associated media storage account for songs (or other media content), browse titles and choose to play choices, or forward media content in the media storage account 31 to a person he has in his contact list.

This feature provides a backup of the user's media content, provides an easy way for the user to request and play media content in the vehicle and provides an easy way for the user to share media content with other users.

Vehicle-to-Vehicle Chatting Networks

Referring to FIG. 3, in addition to basic communication with other vehicles 8, the user may also instruct the system to create or request membership to several on-the-road communication groups or networks 62. These groups or networks 62 consist of two or more system users that are connected by the array of servers 27 in such a way that they may communicate with each other while driving, much like a teleconference.

Each user may define each of his on-the-road networks 62 as his [NAME] on-the-road network. The system will refer to each network 62 by this specification. The user can (via voice commands) invite selected contacts from the user contact list to be added to the network 62. Each user can be a member of more than one network 62.

The user information and profile 30 of each member of the network 62 is stored to the server 27, and when a member of the network 62 arrives within range of his vehicle 8, the system will notify all other active members of the network 62 via either voice or tone notification depending on the individual user's preferences.

While on the road, the user can instruct the control unit 11 by voice command to connect him or her to an ongoing chat session of a particular network 62. The user may also instruct the control unit 11 to only listen to the chat session wherein the user may only listen to the dialogue among the active on-the-road communication network 62 (or more than one network 62 simultaneously). The user can additionally initiate a chat session by verbally specifying with which network 62 he wishes to engage.

Alternately, the user may also instruct the control unit 11 to hide his active status from any of his on-the-road networks 62. The user may also instruct the control unit 11 to withdraw from any given chat session at any given time.

During an on-the-road chat session, communication can be delivered by two means. The control unit 11 can translate the user's voice to text message, where the text message is then distributed to all active members in the network 62 through normal text messaging servers or via the system servers 27, which are then converted to speech by the control units 11 of the other users. The control unit 11 can also distribute voice notes, or recordings of the user's voice, to all active members in the network 62 via the servers 27. Alternatively, or as an option, the communication among the members of the network 62 may also be provided as real-time voice, as in a telephone conference. The voice may be provided as VOIP via server 27 or normal cell phone connections via the mobile devices 12.

During an on-the-road chat session, the control unit 11 may use the servers 27 backend to manage and process exchanges among the members of a network in order to ensure timely content delivery.

During an on-the-road chat session, the control unit 11 will continue to manage incoming calls, e-mails, sms, calls, calendar events, and other materials. The user may instruct the control unit 11 to not disrupt his on-the-road chat session or to only interrupt with a tone indicating the arrival of new information.

Voicebook

Referring to FIG. 1, a social media server 66 (e.g. facebook, myspace, twitter, etc.) is accessible via the Internet. Each user has a profile 68, which may include a webpage or feed, with associated other users ("friends" or "followers" etc). With the present system, a user may add a folder 70 to his personal webpage (e.g. facebook, myspace, etc.) which may be public, private, or only available for access by user specified individuals from his contact group. These settings may be specified by voice command to the control unit 11 which modifies the user profile 30 on server 27, which in turn then modifies the profile 68 on server 66 (other arrangements are also possible).

While driving, the user may compose on-the-road notes or thoughts, which are sent from the control unit 11 either directly to the webpage's server 66 (e.g. facebook's server) or to the servers 27 for posting to the webpage's server 66. The control unit 11 (or server 27) will post these voice recordings as entries in the folder 70 for contacts to access. Alternatively, the voice recording may first be converted to text. Once a note has been posted, the servers 27 will notify the other system users (that have access to the folder, e.g. "friends" or "followers" or the like) that a thought/note has been posted. The form of the folder 70 may depend on the form of the social media. The folder 70 may take the form of a webpage or feed or status or post or any other form required by the social media server 66.

The secondary user may instruct their control unit 11 to retrieve the note and play the file to them as they drive. Additionally, users can also access and listen to the note using a computer by downloading and opening the notes as audio files.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, the invention is not limited to being provided in a car, but can also be provided in any mobile environment.

What is claimed is:

1. A method of communicating between vehicles including the steps of:
   a) receiving a verbal request from a user to create a group;
   b) in response to said step a), creating a group having a plurality of members associated therewith, wherein the user is one of the plurality of members;
   c) receiving a verbal request from the user to add a contact to the group;
   d) associating the contact as a new member of the group in response to said step c);
   e) associating each of the plurality of members with the group in profiles associated with each of the plurality of members, the profiles stored in a server;
   f) detecting a presence of each of the members in vehicles associated with each of the members, such members having an active status;
   g) receiving a request from one of the plurality of members to hide his active status from the rest of the plurality of members, wherein the one member is then a hidden member;
   h) indicating to the plurality of members the active status of the plurality of members but not indicating the active status of the hidden member;
   i) based upon said step e) and said step f), providing communication among the plurality of members whose presence was detected in said step f) including the new member.

2. The method of claim 1 wherein said step i) further includes the steps of converting audible speech from one member to text, transmitting the text to the other members of the group and converting the transmitted text to audible speech for the other members.

3. The method of claim 1 wherein said step i) further includes the steps of recording audible speech from one of the members, transmitting the recorded audible speech to the other members of the group and playing the transmitted recorded audible speech for the other members.

4. The method of claim 1 further including the step of prioritizing telephone calls relative to communication among the members of the group based upon preferences set by each member.

5. The method of claim 4 wherein the step of prioritizing includes interrupting the communication among the members of the group with a telephone call.

6. The method of claim 4 wherein the step of prioritizing includes the step of indicating an incoming telephone call to one of the members of the group during communication among the members of the group.

7. The method of claim 1 further including the step of automatically adding the members to a communication session with one another in response to said step e).

8. The method of claim 1 further including the step of receiving a request from one of the members to participate in the communication among the members provided in said step i).

9. The method of claim 1 further including the step of receiving a request from one of the members to listen to the communication among the members but not to participate in the communication among the members.

10. The method of claim 1 further including the step of receiving identification of the plurality of members to associate with the group in said step b).

11. The method of claim 1 wherein the group is a first group, said method further including the step of creating a plurality of groups including the first group, wherein each of the plurality of members is associated with more than one of the plurality of groups.

12. A method of communicating between vehicles including the steps of:
   a) receiving a verbal request at a server to create a group;
   b) in response to said step a), creating a group having a plurality of members associated therewith;
   c) receiving a verbal request from the user to add a contact to the group;
   d) associating the contact as a new member of the group in response to said step c);
   e) detecting a presence of each of the members in vehicles associated with each of the members, including the new member, such members having an active status;
   f) receiving a request from one of the plurality of members to hide his active status from the rest of the plurality of members, wherein the one member is then a hidden member;

g) indicating to the plurality of members the active status of the plurality of members but not indicating the active status of the hidden member; and h) after said step e), receiving communication from each one of the plurality of members including the new member at the server and forwarding the communication from the server to others of the plurality of members including the new member.

13. The method of claim 12 wherein said step h) further includes the steps of converting audible speech from one member to text, transmitting the text from the server to the other members of the group and converting the transmitted text to audible speech for the other members.

14. The method of claim 12 wherein said step h) further includes the steps of recording audible speech from one of the members, transmitting the recorded audible speech to the other members of the group and playing the transmitted recorded audible speech for the other members.

15. The method of claim 12 further including the step of prioritizing telephone calls relative to communication among the members of the group based upon preferences set by each member.

16. The method of claim 13 wherein the step of prioritizing includes interrupting the communication among the members of the group with a telephone call.

17. The method of claim 14 wherein the step of prioritizing includes the step of indicating an incoming telephone call to one of the members of the group during communication among the members of the group.

18. A method of communicating between vehicles including the steps of:

a) associating each of a plurality of members with a group in profiles associated with each of the plurality of members, the profiles stored in a server;

b) receiving a verbal request from the user to add a contact to the group;

c) associating the contact as a new member of the group in response to said step b);

d) receiving a request from one of the plurality of members to hide his active status from the rest of the plurality of members, wherein the one member is then a hidden member;

e) detecting a presence of each of the members in vehicles associated with each of the members; and f) after said steps d) and e), providing communication among the plurality of members indicating the active status of the plurality of members but not indicating the active status of the hidden member.

* * * * *